Aug. 5, 1941.  W. HULSEBOS  2,251,543
WABBLER ENGINE
Filed Oct. 30, 1937
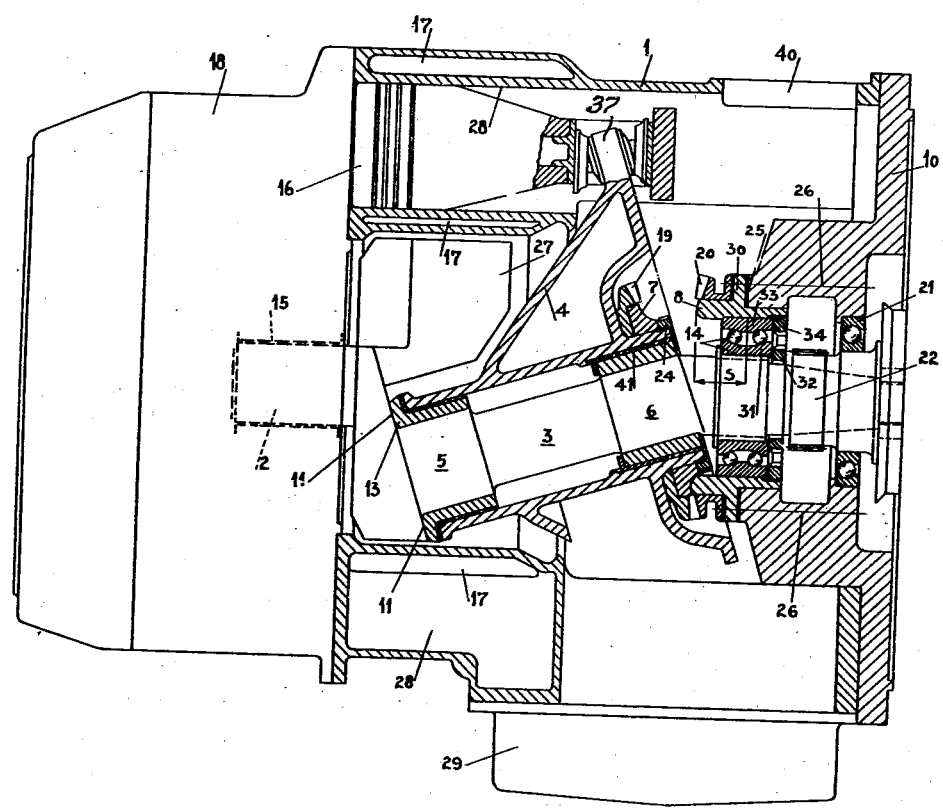
WICHERT HULSEBOS
INVENTOR
By: Haseltine, Lake & Co.
ATTORNEYS Patented Aug. 5, 1941

2,251,543

UNITED STATES PATENT OFFICE 2,251,543

WABBLER ENGINE

Wichert Hulsebos, Laren, Netherlands, assignor to Naamlooze Vennootschap: Hulsemo, Utrecht, Netherlands, a corporation of the Netherlands Application October 30, 1937, Serial No. 171,993
In the Netherlands November 13, 1936

2 Claims. (Cl. 308—135)

This invention relates to a wabbler engine, more specifically a wabbler engine comprising a plurality of cylinders arranged with their axes in parallel relation with and around the crank shaft and provided with means for transmitting to the engine frame the axial pressure exerted by the pistons upon the wabbler.

This means comprise a bearing face provided on the wabbler which is adapted, during operation of the engine, to roll on a mating face provided on the frame.

Such engines may be constructed as internal combustion engines for motor cars and the like.

The object of my present invention is to improve engines of this kind.

In accordance with my invention the crank shaft of the engine, which carries the wabbler, is supported in axial direction by means of an axial thrust bearing. Preferably said thrust bearing is arranged at so small a distance from the bearing faces on the wabbler and the frame that said faces, during operation of the engine, cooperates without harmful clearance.

Owing to this construction it is rendered impossible that the bearing faces move relatively to each other in an axial sense. If e. g. a combustion motor is used for breaking purposes, a strong suction action is exerted on the pistons. Due to this fact the bearing faces sometimes have a tendency to leave each other i. e. their contact and cooperation is disturbed. This must be avoided because the bearing faces may be seriously damaged when they are abruptly brought into contact again, as soon as the suction action on the pistons ceases.

The annexed drawing illustrates by way of example only and in axial sectional elevation a preferred form of my invention.

The cylinders 28 in the block 1 are disposed equidistantly from the crankshaft 2 and in parallel relation therewith, the oblique crank 3 carrying the wabbler 4. Said wabbler has interior bearings 13 and 41 mounted on the trunnions 5 and 6 on the crank 3, on which the wabbler is freely rotatable.

The pistons 16 engage the peripheral arms 37 of the wabbler 4 in any suitable manner.

The manner shown in the drawing is that which has been described in my United States specification 1,842,322.

Secured to the wabbler 4 by means of a nut 24 is an annular plate 7 having a curved bearing face cooperating with a mating bearing face of a member 8 secured to the frame part 10.

In order to prevent the wabbler from rotating with respect to the longitudinal axis of the engine, a conical gear 19 is secured to the wabbler. During operation said gear 19 rolls over a gear 20 secured to the frame part 10.

The lines 26 indicate the direction of the bolts by means of which the gear 20 and a collar 30 of the member 8 are secured to the frame part 10. For adjusting the surfaces 7 and 8 thin filling rings 25 are inserted between the collar 30 and the frame part 10.

An annular race 31 of an axial thrust ball bearing 14 is secured to the crank shaft 2, by means of a nut 32.

The outer race 33 of said bearing 14 is secured to the member 8 by means of a nut 34.

Due to the bearing means 14 and the outer race 33 which cooperates therewith the bearing faces of members 7 and 8 are always kept tight together.

The axial distance between the bearing 14 and the bearing face of the member 8 is as short as possible. If this distance is too great due to relatively elongations on account of the heat a harmful clearance between the faces 7 and 8 might be caused.

The other end of the chank shaft 2 may be supported in an ordinary slide bearing 15. However, this may also be an axial thrust bearing. The cylinder head 18 has not been detailed.

The cylinders 28 are provided with water jackets 17. Below the cylinder block 1 there is an oil carrier 29.

A gear 22 is mounted to the crank shaft for driving an oil pump.

An end bearing 21 for the crankshaft 2 is provided.

The pistons are mounted in the wabbler by using the aperture 40 in the casing 1, which is closed by a cover (not shown). The crankshaft 2 carries a weight 27 for balancing purposes.

At the left side in the drawing the wabbler 4 bears against a member 13 which in turn bears against the surface 11 of the crankshaft 2.

Clearance between the part 13 and the surface 11 should be avoided.

What I claim is:

1. In axial thrust bearing means for the crankshaft of a wobbler engine of the type having an inclined crank disposed wholly upon one side of the main axis of the crankshaft, and a wobbler element mounted on said crank, the feature comprising a stationary bearing member in said engine surrounding a straight portion of the crankshaft and a corresponding rotatable bearing member fixed upon said straight portion adjacent to and immediately before the beginning of the inclination of the inclined crank, and together with the stationary bearing member forming an axial thrust bearing, a second stationary bearing member in said engine disposed as closely adjacent with axial direction to the first stationary bearing member of said axial thrust bearing as mechanically practicable comprising a generally annular pressure portion having an axis coinciding with the main axis of rotation of the crankshaft, and a corresponding movable bearing member adapted to be located upon said wobbler element and comprising a second generally annular pressure surface portion having an inclined axis which coincides with that of the inclined crank and making rolling contact against said first or stationary pressure surface portion so as to prevent backlash between said pressure surface portions and support and prevent displacement of the crankshaft in axial direction and thereby prevent undue wear of the various bearings and wobbler of the engine involved.

2. An axial thrust bearing according to claim 1, wherein means are included for preventing rotation of the movable bearing member and positively causing and ensuring rolling contact of the same with the stationary bearing member, and wherein the axial thrust bearing as a whole is of less diameter than, and within the circular outline or profile of the stationary annular pressure portion of the second stationary bearing member.

WICHERT HULSEBOS.